US010813493B2

(12) United States Patent
Alipour

(10) Patent No.: US 10,813,493 B2
(45) Date of Patent: Oct. 27, 2020

(54) FOOD PREPARATION APPLIANCE

(71) Applicant: Ehsan Alipour, San Rafael, CA (US)

(72) Inventor: Ehsan Alipour, San Rafael, CA (US)

(73) Assignee: Unovo, LLC., Richmond, CA (US)

( * ) Notice: Subject to any disclaimer, the term of this patent is extended or adjusted under 35 U.S.C. 154(b) by 190 days.

(21) Appl. No.: 16/015,061

(22) Filed: Jun. 21, 2018

(65) Prior Publication Data

US 2018/0368616 A1 Dec. 27, 2018

Related U.S. Application Data

(60) Provisional application No. 62/523,151, filed on Jun. 21, 2017.

(51) Int. Cl.
*A47J 37/06* (2006.01)
(52) U.S. Cl.
CPC .... *A47J 37/0611* (2013.01); *A47J 2037/0617* (2013.01)
(58) Field of Classification Search
CPC ............ A47J 37/0611; A47J 3037/0817; A47J 2037/0617
USPC ................... 99/376, 379, 375, 377
See application file for complete search history.

(56) References Cited

U.S. PATENT DOCUMENTS

| 2,899,888 | A | * | 8/1959 | Koci | A47J 37/0611 99/331 |
| 3,313,230 | A | * | 4/1967 | Simjian | A47J 37/0611 99/375 |
| 4,102,256 | A | * | 7/1978 | John | A47J 37/0611 219/525 |
| 7,109,442 | B2 | * | 9/2006 | Steinberg | A47J 37/0611 219/386 |
| 2014/0076301 | A1 | * | 3/2014 | Wang | A47J 37/0611 126/261 |

FOREIGN PATENT DOCUMENTS

WO   WO-2017197482 A1 * 11/2017 .......... A47J 37/0611

* cited by examiner

*Primary Examiner* — Reginald Alexander
(74) *Attorney, Agent, or Firm* — GSS Law Group; Gregory S. Smith; Phillip M. Wagner

(57) ABSTRACT

An apparatus for heating food includes a base and a lid coupled to one another by a hinged handle. Two fluid-filled thermal fluid vessels with flexible surfaces are installed in the lid and base to form a chamber for holding a food item in a low temperature cooking container f. The thermal fluid vessels may be replaced with high temperature cooking plates to sear or brown the food items. A user of the appliance is protected from exposure to hot thermal fluid retained in the vessels during low temperature cooking.

19 Claims, 10 Drawing Sheets

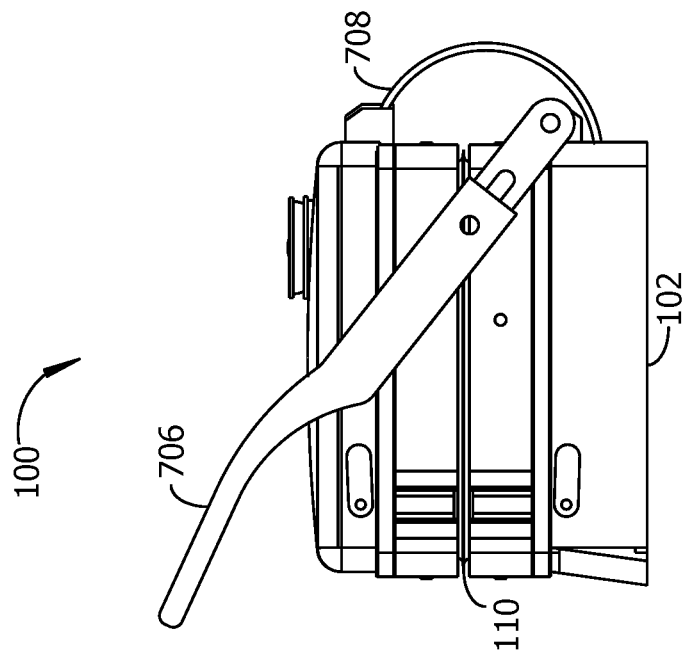
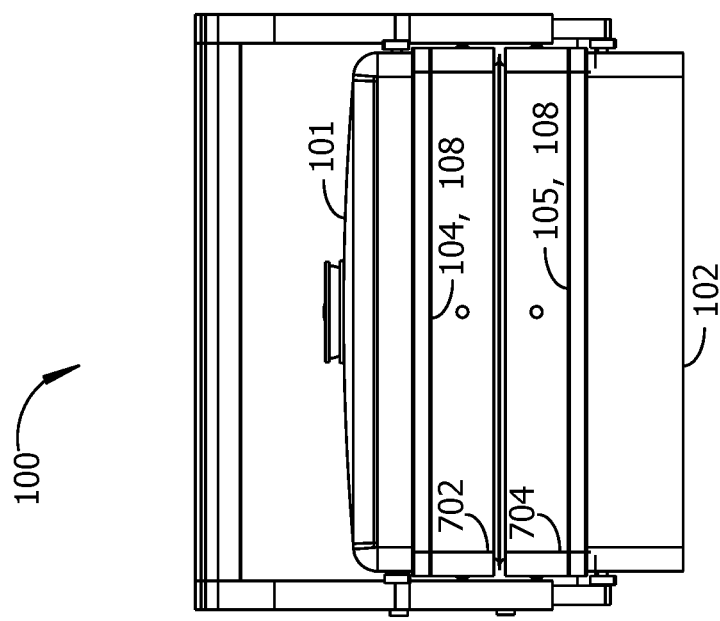

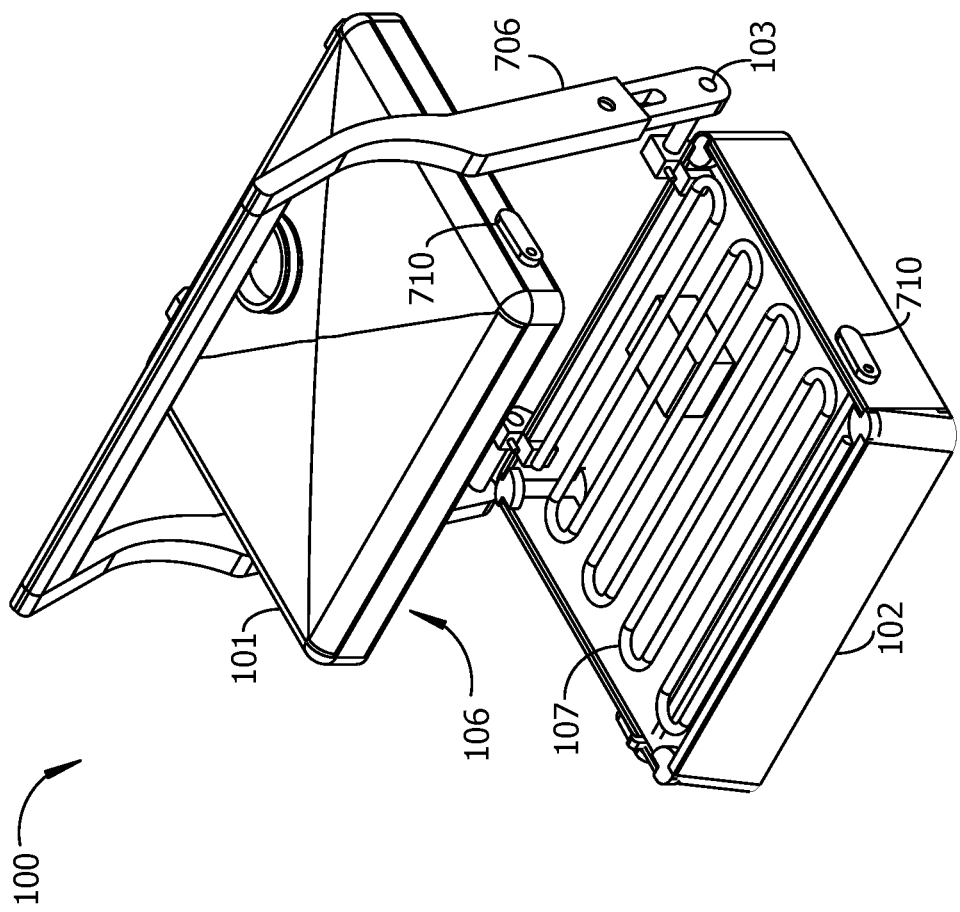

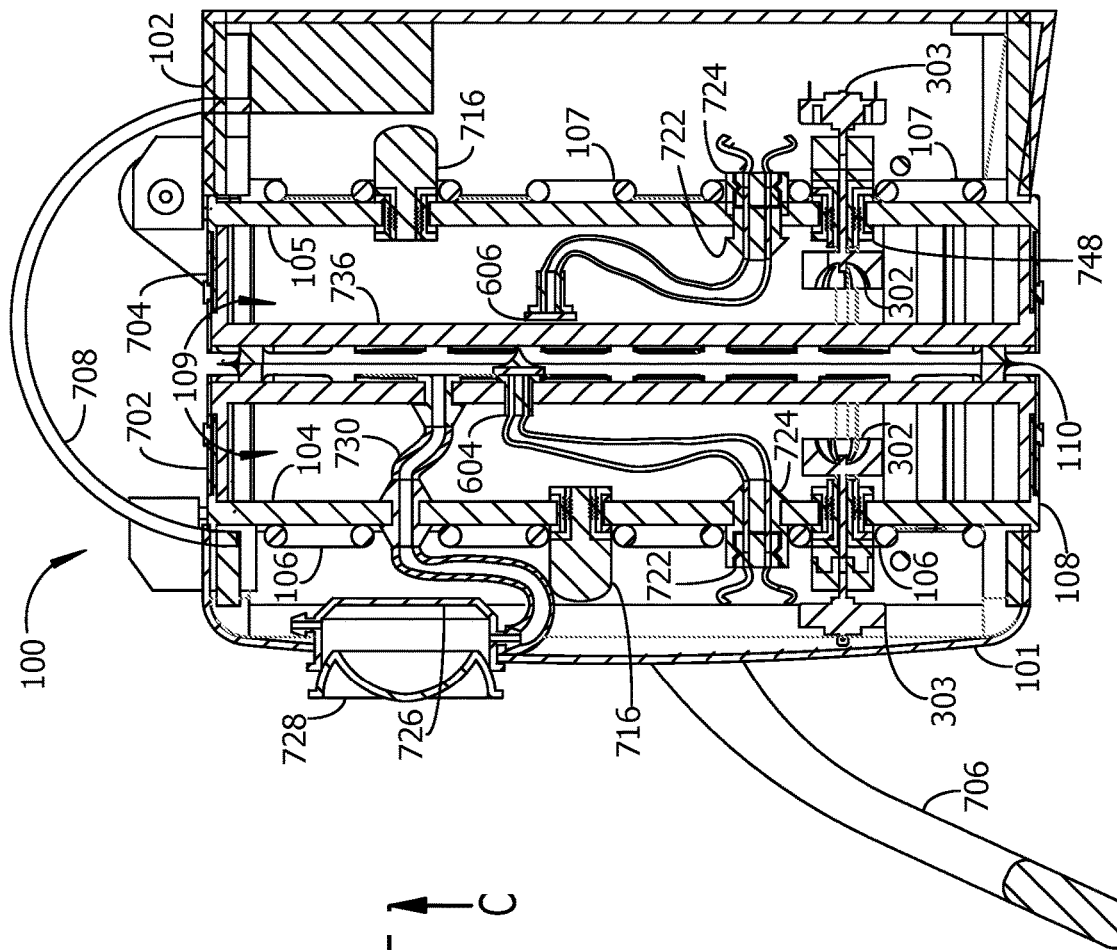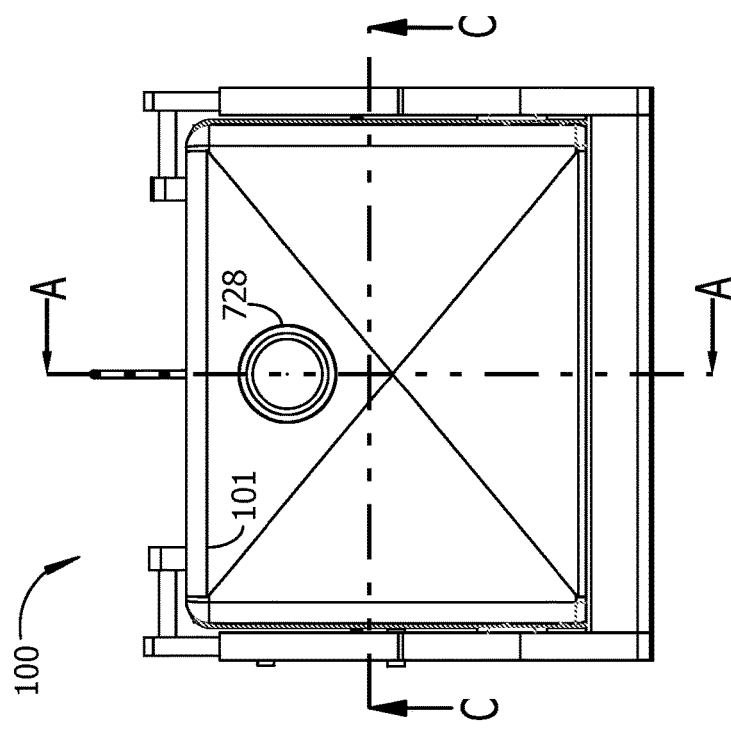

FOOD PREPARATION APPLIANCE

CROSS REFERENCE TO RELATED APPLICATIONS

This application claims priority to U.S. Provisional Patent Application No. 62/523,151, titled "Methods and Devices For Heating Food Items", filed Jun. 21, 2017, incorporated herein by reference in its entirety.

FIELD OF THE INVENTION

Embodiments of the invention are related generally to equipment for electric appliances for preparing food by heating and/or cooling the food.

BACKGROUND

Low temperature precision cooking is the practice of cooking food for extended periods in high thermal conductivity environments at a precisely controlled temperature. Sous vide is an example of low temperature precision cooking, where low temperature cooking may refer to cooking at temperatures below the boiling point of water. The sous vide method places a food item to be cooked in a watertight and possibly airtight container that is sealed and submerged in a water bath held at a constant selected temperature, preferably controlled to within 0.1 degree Celsius of a selected cooking temperature. Sous vide cooking may preserve food flavor and nutritional value better than high-temperature cooking methods.

It may be difficult to control the water bath to remain constant within a relatively narrow temperature range. Furthermore, there may be a safety risk for persons working in the vicinity of the heated water bath, who may inadvertently come into contact with the hot water. After a food item has reached the desired cooking temperature and is cooked sufficiently for safe consumption, it may still be preferable to brown the food to enhance the flavor and surface texture and improve the visual appeal of the food.

SUMMARY

An apparatus for heating a food item includes a low temperature cooking container formed from two of a thermal fluid vessel. An example of a thermal fluid vessel includes a heat transfer plate and a flexible panel attached to the heat transfer plate with a watertight fluid chamber formed between the flexible panel and the heat transfer plate.

The apparatus further includes a base configured for removable attachment of a first of the thermal fluid vessel; and a lid movably coupled to the base, the lid configured for removable attachment of a second of the thermal fluid vessel. The first and second thermal fluid vessels, when pressed together by closing the lid against the base, form a sealed chamber in a low temperature cooking container for cooking the food. Separating the lid from the base separates the first thermal fluid vessel from the second thermal fluid vessel, thereby opening the low temperature cooking container.

The apparatus may further include a first and a second high temperature cooking plate, wherein the first high temperature cooking plate is configured for removable attachment to the base after removal of the first thermal fluid vessel, and the second high temperature cooking plate is configured for removable attachment to the lid after removal of the second thermal fluid vessel. At least one of the first and second high temperature cooking plates includes an integrally formed heating element configured for high temperature cooking. The base may optionally include a heating element positioned for heating the first high temperature cooking plate. The lid may optionally include a heating element positioned for heating the second high temperature cooking plate A container heating element may optionally be formed as an integral part of the flexible panel in at least one of the first and second thermal fluid vessels. The container heating element may alternatively be positioned inside the fluid chamber or attached to a surface of the flexible panel.

The apparatus may further include a controller electrically connected to the container heating elements in the first and second thermal fluid vessels. A temperature sensor may optionally be electrically connected to the controller, wherein the temperature sensor is positioned to measure a temperature on the high temperature cooking plate. A second temperature sensor may optionally be electrically connected to the controller, wherein the second temperature sensor may be positioned on the low temperature cooking container to measure a temperature inside the fluid chamber.

The apparatus may optionally include a motor electrically connected to the controller and an agitator configured to be rotated by the motor, wherein the agitator is rotatably coupled to the heat transfer plate in at least one of the first and second thermal fluid vessels, and the agitator positioned to stir a fluid in the fluid chamber.

The controller may be configured to detect a presence of the high temperature cooking plate and the thermal fluid vessel in the base and lid and control the base heating element, the lid heating element, and the container heating element in response to a detected result.

A food chamber for receiving the food to be heated is formed between the first thermal fluid vessel and the second thermal fluid vessel when the lid is lowered onto the base. A watertight seal is formed between the first thermal fluid vessel and the second thermal fluid vessel by a gasket surrounding a food contact surface on each vessel. The gaskets on the first and second thermal fluid vessels may optionally be configured to allow air to escape from the food chamber when the lid is lowered onto the base.

An example apparatus may optionally include a vacuum pump in fluid communication with the food chamber, wherein the flexible panel on the first thermal fluid vessel is drawn toward the flexible panel on the second thermal fluid vessel by operation of the vacuum pump.

BRIEF DESCRIPTION OF THE DRAWINGS

FIG. 3 is a front view of the example of an appliance from FIGS. 1-2.

FIG. 4 is a side view of the example of an appliance from FIGS. 1-3.

FIG. 5 is a pictorial view of the base and lid of the previous figures, with the lid raised away from the base and a heating element in the base exposed by removal of the thermal fluid vessel.

FIG. 6 is a view toward the top surface of the lid of the appliance, showing positions of cross-sectional views in other figures.

FIG. 7 is a cross-sectional view A-A of the appliance closed as in FIG. 4. A position and viewing direction for the cross section is marked by a section line A-A in FIG. 6.

DESCRIPTION

Figure 2:
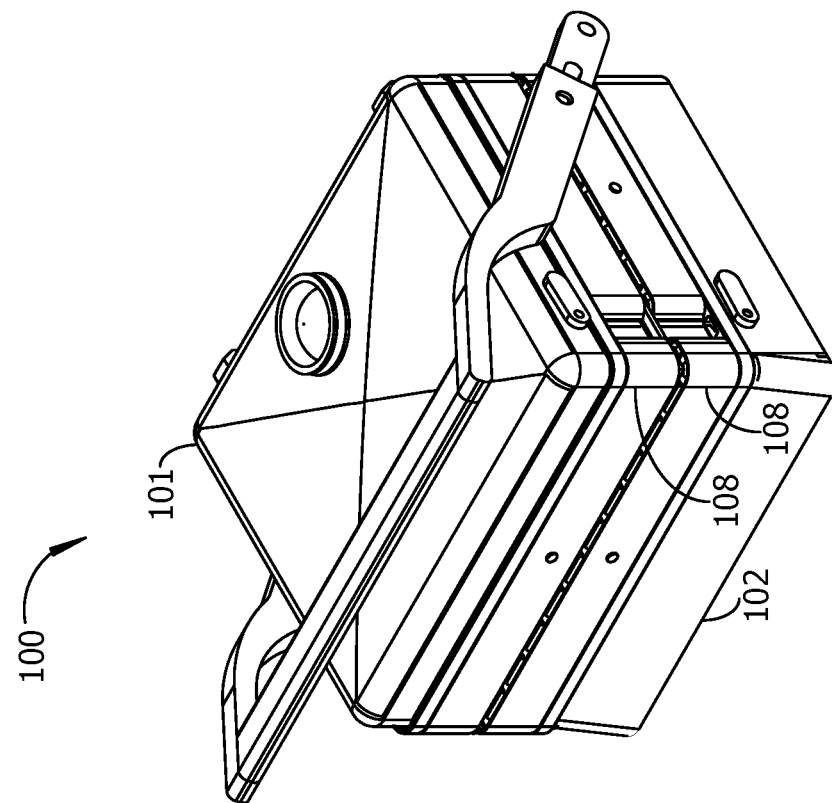
FIG. 2 shows the example appliance of FIG. 1 with the lid pressed downward onto the base, thereby forming a low temperature cooking container by pressing the thermal fluid vessel in the base against the thermal fluid vessel in the lid to form a food chamber between the vessels.
Figure 1:
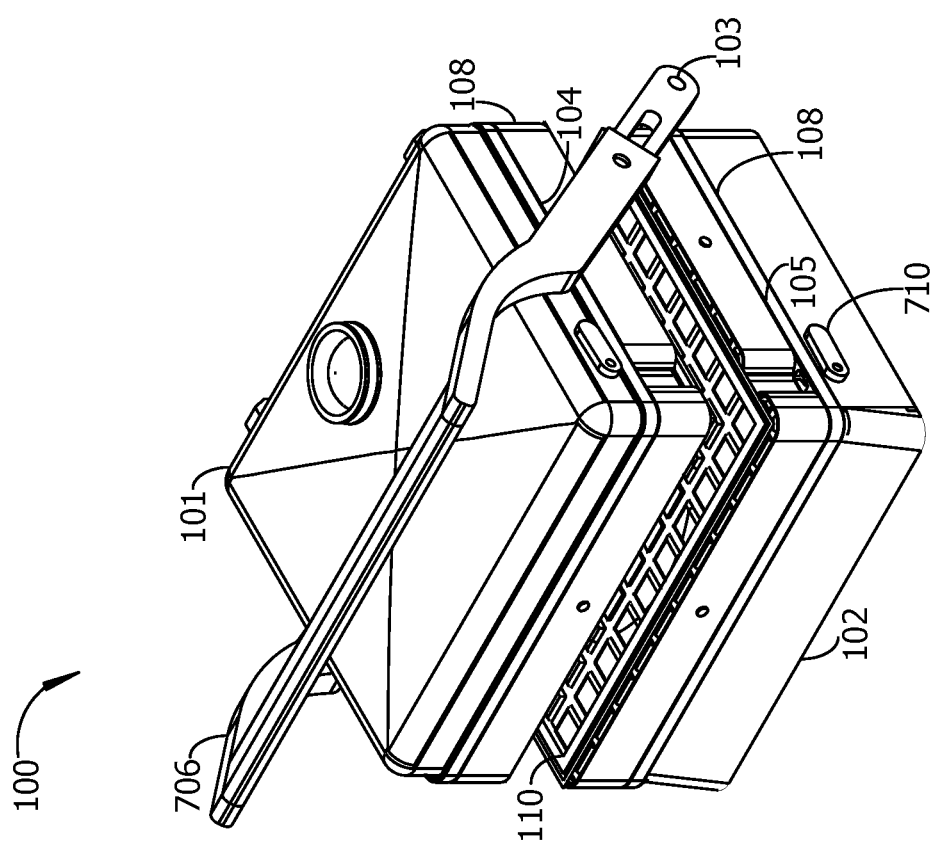
FIG. 1 is a pictorial view toward the top and side of an example of a food preparation appliance with the lid moved away from the base by operation of a hinged handle to show examples of a food contact surface on a thermal fluid vessel removably attached to the base, with a second thermal fluid vessel removably attached to the lid.
Figure 8:
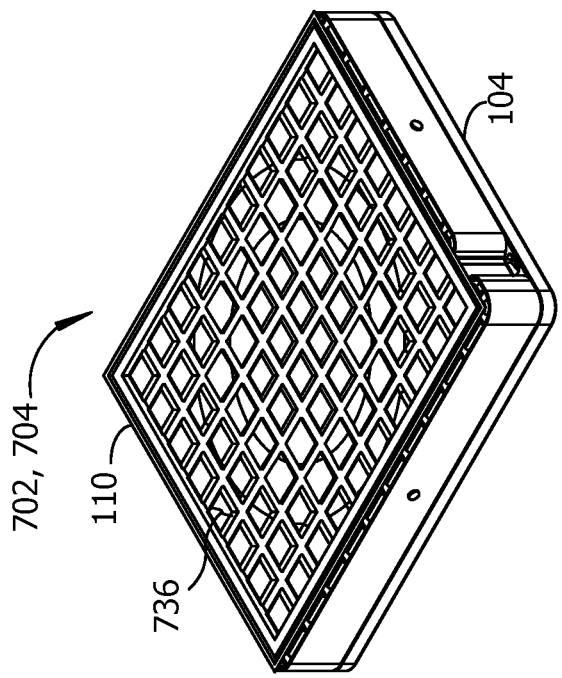
FIG. 8 is a pictorial view of an example of a food contact surface on a flexible panel attached to the rigid side walls of a heat transfer plate from a thermal fluid vessel.
Figure 11:
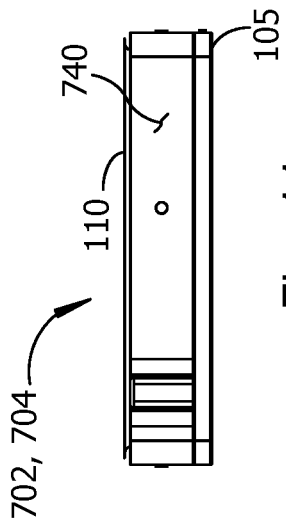
FIG. 11 is a side view of the example thermal fluid vessel of FIGS. 8-10.
Figure 9:
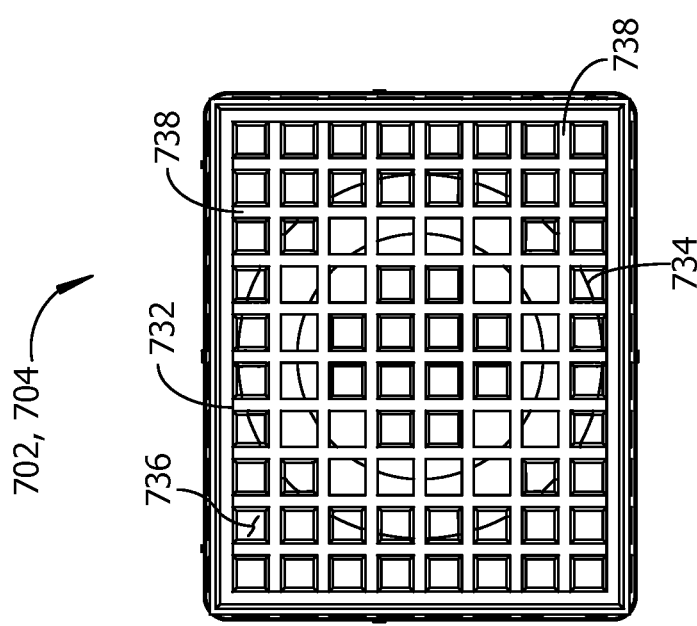
FIG. 9 is a view toward the food contact surface of the example thermal fluid vessel of FIG. 8.
Figure 10:
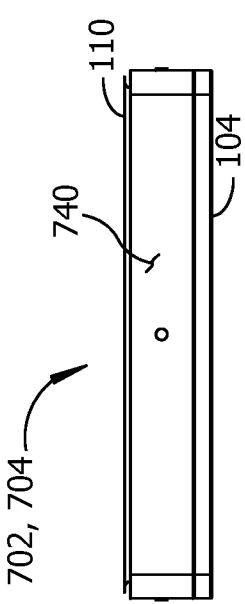
FIG. 10 is a view toward the front side of the example thermal fluid vessel of FIGS. 8-9.
Figure 13:
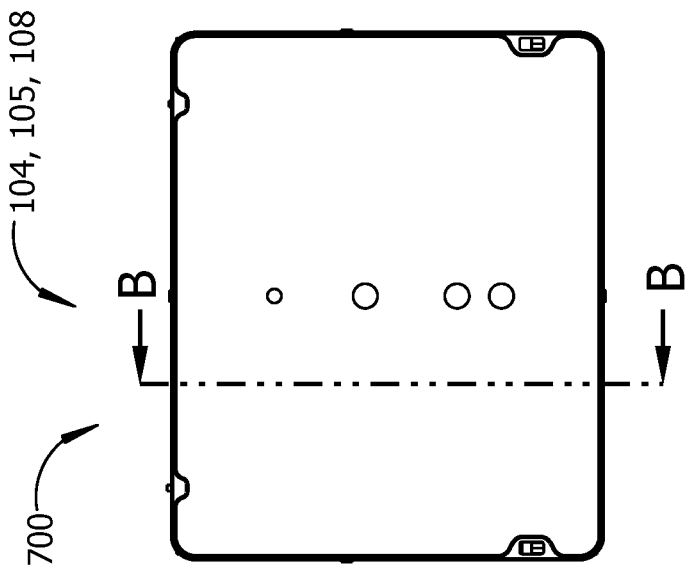
FIG. 13 is a view toward a top side of the example low temperature cooking container of FIG. 12.
Figure 12:
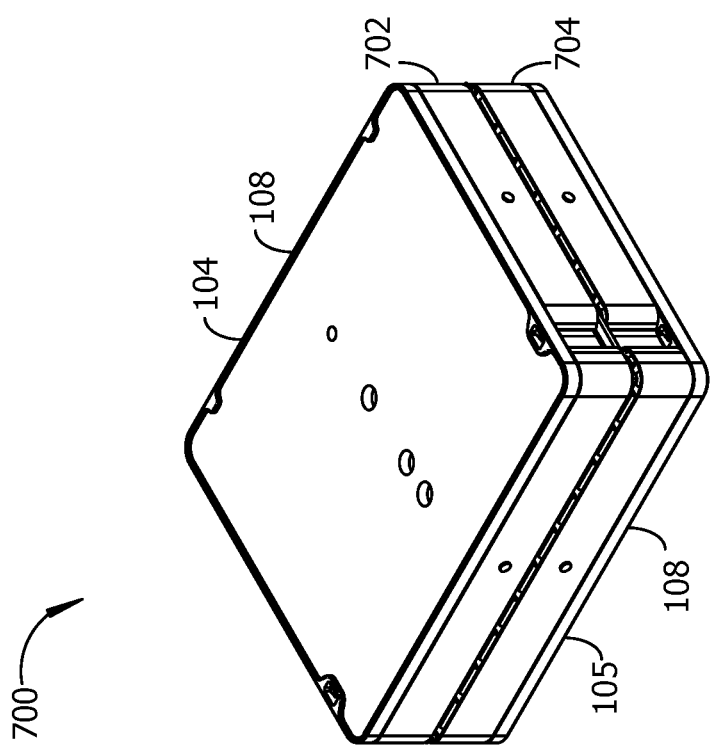
FIG. 12 shows a pictorial view of an example of a low temperature cooking container formed from an upper thermal fluid vessel in contact with a lower thermal fluid vessel.

A cooking appliance provides for cooking of a food item by exposing the food to a pair of opposing food contact surfaces heated to a relatively low temperature by contact with a thermal transfer fluid such as water or oil. The thermal transfer fluid is retained in a liquid-tight thermal fluid vessel and is heated by a heating element that maintains the temperature of the fluid, the food contact surfaces, and therefore the food item, within a narrow range of a selected cooking temperature. The food to be cooked is held in a food chamber between two thermal fluid vessels pressed against one another to form a low temperature cooking container, one thermal fluid vessel removably retained in the lid of the appliance and one in the base. The thermal fluid vessels seal to one another when the lid is closed onto the base. When the food item has been cooked to a selected degree of doneness, the food item may removed from the low temperature cooking container formed by the two thermal fluid vessels by raising the lid from the base to open the food chamber between the vessels. The two thermal fluid vessels forming the low temperature cooking container may be replaced by a pair of high temperature cooking plates which may be heated sufficiently to sear or brown the food item.

Low temperature cooking to preserve flavor and nutritional value, and high temperature cooking to provide preferred texture and visual appearance of a food item, may therefore be achieved with a single appliance. Furthermore, because the thermal transfer fluid is contained within a sealed container, a person using the appliance is not exposed to hot fluid while placing food in the container or removing cooked food from the container. Embodiments of the disclosed cooking appliance provide the advantages of sous vide cooking without exposing nearby persons to burns from hot immersion baths, in contrast to traditional sous vide equipment.

FIGS. 1-5 show views of an example cooking appliance embodiment 100 configured for low temperature cooking. A lower housing 102, also referred to as a base 102, is movably coupled to an upper housing or lid 101, for example by a handle 706, although other methods for coupling the lid and base will be known to a person of ordinary skill in the art. The handle may be rotatably coupled to the base and lid by hinges 103. The lid and base are preferably coupled to one another in a manner that permits objects of different thicknesses to be placed between the lid and base, for example food items, a high temperature cooking plate, and a low temperature container. A thermal fluid vessel 702 installed in the lid may be pressed against another thermal fluid vessel 704 in the base by lowering the lid toward the base, as suggested in the example of FIG. 2. A gasket 110 on each of the upper and lower thermal fluid vessels seals a food item to be cooked into a space between the containers. The gaskets are shaped to allow air to be expelled from the space between the vessels when the lid is closed, forming a liquid-tight seal around the food item during low temperature cooking. An upper heat transfer plate 104 forms part of the upper thermal fluid vessel 702 in the lid. A lower heat transfer plate 105 forms part of the lower thermal fluid vessel 704 in the base. The heat transfer plates distribute thermal energy evenly and efficiently to a thermal fluid retained in a fluid chamber in thermal fluid vessel. A latch release 710 in the base and another latch release 710 in the lid may be operated to remove the thermal fluid vessels from the appliance, either for cleaning or to install high temperature cooking plates.

FIGS. 3-4 show example views of the closed appliance, with the upper thermal fluid vessel 702 and the lower thermal fluid vessel 704 in contact with one another and sealed to one another by a pair of opposing gaskets 110 that surround the food chamber formed between the thermal fluid vessels (702, 704). Electrical connections between the base and lid may be made through a flexible multiconductor cable 708.

The base and lid each contain a heating element as suggested in the example of FIG. 5. The heating elements (106, 107) are visible in the example of FIG. 5 because the removable upper and lower thermal vessels (702, 704) and upper and lower high temperature cooking plates 742 have been removed from the appliance 100. The heating element 107 in the base and the heating element 106 in the lid may be controlled for both high temperature cooking and low temperature cooking.

Figure 15:
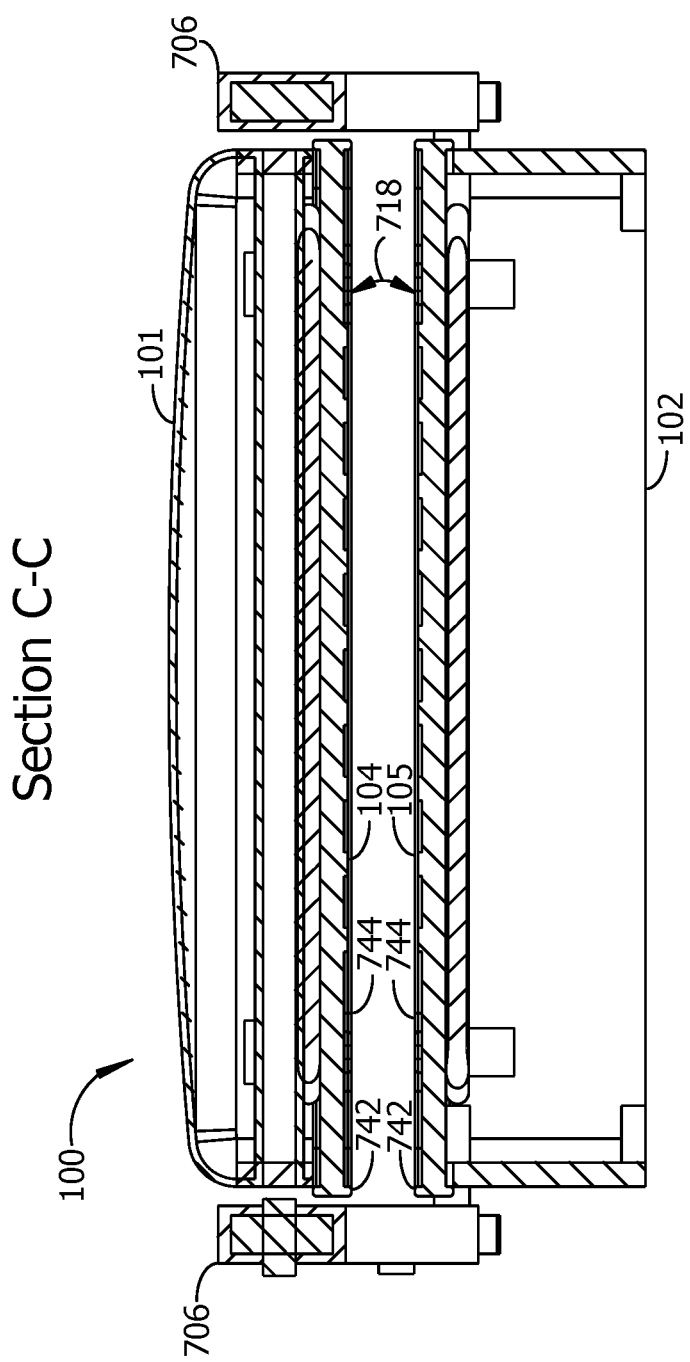
FIG. 15 is a cross-sectional view C-C of the example appliance of the previous figures, showing examples of two high temperature cooking plates replacing the two thermal fluid containers of the previous figures.

Cross-sectional view A-A in FIG. 7 from the example apparatus 100 of FIG. 6 shows examples of some internal details of an appliance embodiment 100. The appliance 100 is shown configured for low temperature cooking, with an upper thermal fluid vessel 702 removably retained in the lid 101 and a lower thermal fluid vessel 704 removably retained in the base 102. The upper and lower thermal fluid vessels are examples of two parts of a movable thermal fluid-filled flexible container 108. Components installed in the base include a lower heating element 107 positioned to contact the lower heat transfer plate 105 in the thermal fluid vessel or the high temperature cooking plate 742 (ref. FIG. 15). The lower heating element 107 may alternatively be formed as an integral part of the high temperature cooking plate.

Figure 18:
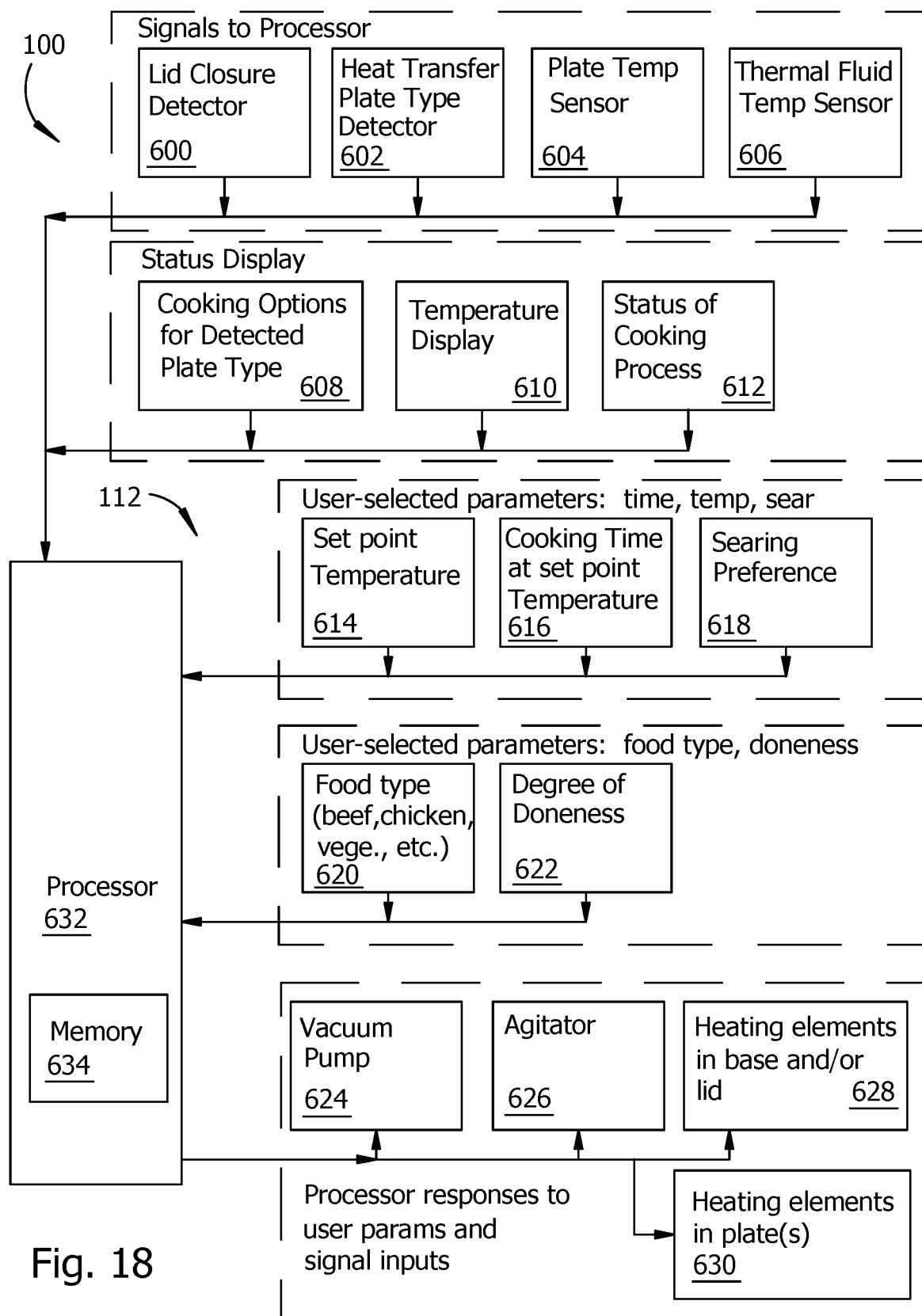
FIG. 18 is a block diagram showing examples of electrical components and electrical connections in some embodiments of the cooking appliance.

A liquid-tight electrical connector having a fixed part 724 and a removable part 722 provides an electrical connection from an electronic controller 112 (ref. FIG. 18) in the base 102 to a thermal fluid temperature sensor 606 positioned to measure a temperature of a thermal fluid in the fluid chamber 109 of the thermal fluid vessel (702, 704). In some embodiments of an appliance 100, an optional electric motor 303 in the base is detachably coupled to an agitator 302 in the fluid chamber 109 through a liquid-tight seal and drive coupling 748. In other embodiments, the motor and agitator may be coupled to one another magnetically or inductively without a direct mechanical connection. In yet other embodiments, the motor and agitator may be omitted. A heating element 107 may be installed in the base or may alternatively be provided as an integral part of a heat transfer plate 105. A thermal fluid fill cap 716 provides for filling and removing thermal fluid such as oil or water from the fluid chamber 109 in the thermal fluid vessel on the base.

In the lid 101, another temperature sensor 604 may be positioned to read a temperature of a food item being prepared. Electrical connections between the controller 112 and the sensor 604 may be made through another liquid-tight electrical connector (722, 724). A heating element 106 may be installed in the lid or may alternatively be provided as an integral part of a heat transfer plate 104. A thermal fluid fill cap 716 provides for filling and removing thermal fluid such as oil or water from the fluid chamber 109 in the low temperature cooking container in the lid.

Figure 14:
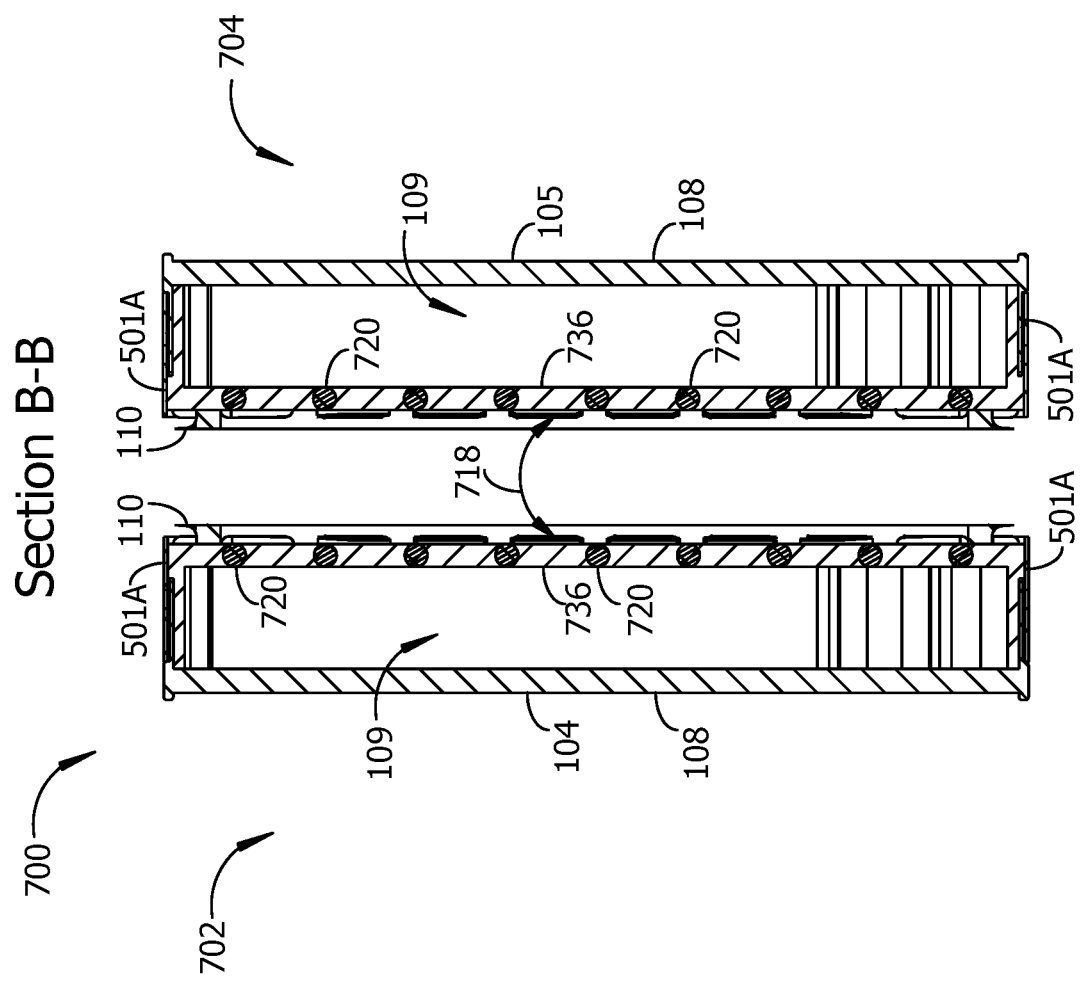
FIG. 14 is a cross-sectional view B-B of an upper thermal fluid vessel and a lower thermal fluid vessel separated by a void space corresponding to a food chamber for receiving a food item to be heated. A location and viewing direction for the cross-sectional view is marked by a section line B-B in FIG. 13.

In the example of FIG. 7, a food item to be cooked would be placed between the flexible panel 736 of thermal fluid vessel in the base and the corresponding flexible panel in the thermal fluid vessel in the lid, the space between the flexible panels 736 corresponding to a food chamber 718 (ref. FIG. 14). Liquid that accumulates in the food chamber may be withdrawn through tubing 730 coupled to a drip receptacle 726 with a cover 728. Liquid may be withdrawn by a vacuum pump 624 installed in the base or alternatively in the cover, or an external vacuum pump may be connected to the drip receptacle. Gaskets 110, one on each of the upper and lower thermal fluid vessels, contact one another to form a liquid-tight seal around the food chamber between the vessels. The gaskets are configured to allow air to escape from the food chamber when the lid is closed onto the base, forming a liquid-tight seal when the lid is closed. A food item being cooked in the food chamber 718 may be removed from the chamber by raising the lid away from the base, unsealing the gaskets 110 from one another and exposing the food item to view.

Examples of a low temperature cooking container 108 comprising two thermal fluid vessels, an upper vessel 702 and a lower vessel 704, are shown in FIGS. 9-14. Rigid side walls 740 are attached to, or alternatively formed as an integral part of, a heat transfer plate (104, 105). The heat transfer plate and side walls may be made from metal with good thermal conductivity, e.g. aluminum, steel, stainless steel, and so on. A flexible panel 736 is sealed to the side walls to form a fluid chamber 109 inside the container. The flexible panel may be made from silicone rubber or another flexible, food-safe material capable of sustained exposure to hot thermal fluid, salt, oil, water, grease from food, and so on. The exposed surface of the flexible panel 736 provides a food contact surface 732, against which a food item is placed during cooking. Channels 738 may optionally be formed in the food contact surface 744 to permit liquid to drain away from a food item being cooked. An area for locating food 734 may be formed to be more flexible than other parts of the flexible panel to permit the area 734 to conform more readily to the surface of the food item in the food chamber 718. The gasket 110 surrounds the outer edges of the flexible panel 736.

Some details of an example low temperature cooking container 700 including a food chamber 718, upper thermal fluid vessel 702, and lower thermal fluid vessel 704 are shown in a cross-sectional view in FIG. 14. Container walls 501A are joined to, or alternatively formed as an integral part of, a thermal transfer plate (104, 105), with a fluid chamber 109 formed between the flexible panel 736 and the thermal transfer plate. A container heating element 720 may be formed as an integral part of the flexible panel or may alternatively be positioned inside the fluid chamber 109. A space between the flexible panels 736, surrounded by the gaskets 110 on each container, forms the food chamber 718 for holding a food item to be cooked. In embodiments having an optional vacuum pump, the flexible panels may be drawn toward one another, into closer contact with a food item being pumped, by partially evacuating the food chamber 718.

Figure 16:
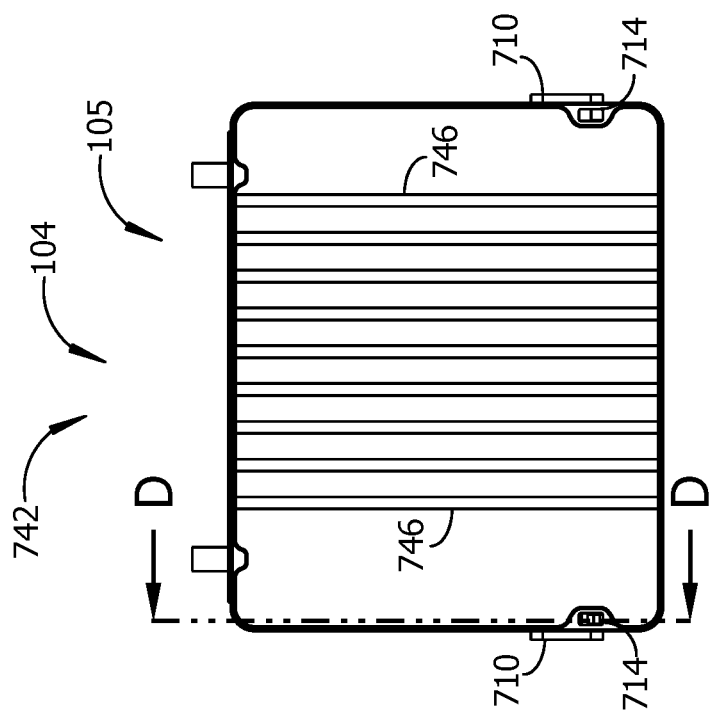
FIG. 16 shows a view toward a food contact surface formed with optional channels on an example high temperature cooking plate.

FIG. 15 shows an example of the appliance embodiment 100 configured for high temperature cooking, for example searing or browning of a food item. In the example of FIG. 15, the low temperature cooking container 108 has been removed from the appliance 100 and replaced by an upper high temperature cooking plate 742 and a lower high temperature cooking plate 742. The opposing food contact surfaces 744 on each plate 742 define the food chamber 718. When a food item is placed on the lower plate in the food chamber 718, the lid may be lowered to place the upper plate in contact with the food to permit both sides of the food to be grilled, browned, or seared simultaneously. As suggested in the example of FIG. 16, the high temperature cooking plates 742 may be formed with channels 746 to permit liquid to drain away from the food and to form a pattern of grill marks on the food. Some embodiments of a high temperature cooking plate 742 omit the channels 746, having instead a flat top surface useful as a griddle.

Figure 17:
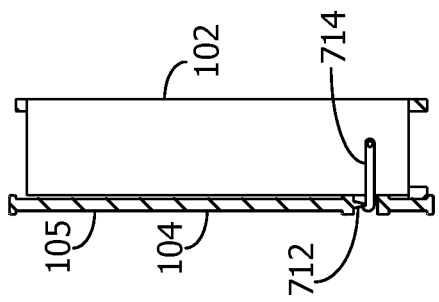
FIG. 17 is a side view of the example high temperature cooking plate of FIG. 16, showing an example of a latch mechanism for retaining the high temperature cooking plate and the thermal fluid vessel in the base.

FIG. 17 shows an example of a latch arm positioned to capture and retain the high temperature cooking plate 742 or thermal fluid vessel (702, 704) in the base. A second latch arm is positioned on an opposite side of the base. A similar arrangement of latch arms is provided in the lid. Each latch arm is activated by pressing against a latch release 710 on the exterior of the base and lid. The latch arm captures a ridge 712 formed along an outer wall of the heat transfer plate (104, 105) and along an outer edge of the high temperature cooking plate 742.

The upper and lower high temperature cooking plates 742 and upper 702 and lower 704 thermal fluid vessels may alternatively be removably coupled to the lid and base by spring clips, clamps, captive bolts, and other means for removable mechanical connection.

Examples of electrical components and electrical connections in an appliance embodiment 100 are shown in a block diagram in FIG. 18. An electronic controller 112 includes a processor 632 implemented in hardware, for example a microprocessor or microcontroller, and memory devices 634 in data communication with the processor. Some of the memory 634 may be nonvolatile memory that retains information when electrical power is removed. Components which send electrical signals to the processor include a lid closure detector 600, a heat transfer plate type detector 602, a plate temperature sensor 604, and a thermal fluid temperature sensor 606. One or more status displays and/or indicators provide a user of the appliance with information about cooking options available for a detected heat transfer plate type 608, a temperature display 610, for example a desired set point temperature or a measured temperature of a food item being cooked, and a status indicator 612 for the cooking process, for example a cooking time setting, an error condition such as no heat transfer plate detected or no thermal fluid detected in the fluid chamber, an amount of cooking time remaining, a hot surface indicator, and so on.

Control inputs may be provided to permit a user of the appliance to selected time and temperature parameters, for example a set point temperature for cooking 614, a cooking time duration at the set point temperature 616, and a searing preference 618, i.e., the degree of searing desired. Other user-selectable parameters that may be sent to the processor 632 include the type of food being cooked 620, e.g. beef, chicken, vegetables, and so on, and a degree of doneness 622 desired for the food item, for example rare, medium, well done, and so on.

The controller 112 may direct operation of a vacuum pump 624, an agitator 626, and heating elements 628 in the lid, base, low temperature cooking containers, heating elements 630 in the high temperature cooking plates, in response to detection of lid closure 600, detection of the type of heat transfer plate present (e.g., low temperature cooking container or high temperature cooking plate), user input parameters, and system status and/or error conditions.

Unless expressly stated otherwise herein, ordinary terms have their corresponding ordinary meanings within the respective contexts of their presentations, and ordinary terms of art have their corresponding regular meanings.

The invention claimed is:

1. An apparatus comprising:
   a thermal fluid vessel, comprising:
      a container heating element;
      a heat transfer plate; and
      a flexible panel attached to said heat transfer plate with a fluid chamber formed between said flexible panel and said heat transfer plate;
   a base configured for removable attachment of a first of said thermal fluid vessel;
   a lid movably coupled to said base, said lid configured for removable attachment of a second of said thermal fluid vessel;
   a controller electrically connected to said container heating element in each of said first and second thermal fluid vessels;
   a motor electrically connected to said controller; and
   an agitator configured to be rotated by said motor, said agitator rotatably coupled to said heat transfer plate in at least one of said first and second thermal fluid vessels, and said agitator positioned to stir a fluid in said fluid chamber.

2. The apparatus of claim 1, wherein said first and second thermal fluid vessels form a low temperature cooking container with a sealed chamber for cooking the food when said lid is closed against said base.

3. The apparatus of claim 1, wherein separating said lid from said base separates said first thermal fluid vessel from said second thermal fluid vessel.

4. The apparatus of claim 1, further comprising a first and a second high temperature cooking plate, wherein said first high temperature cooking plate is configured for removable attachment to said base after removal of said first thermal fluid vessel, and said second high temperature cooking plate is configured for removable attachment to said lid after removal of said second thermal fluid vessel.

5. The apparatus of claim 4, wherein at least one of said first and second high temperature cooking plates includes an integrally formed heating element configured for high temperature cooking.

6. The apparatus of claim 4, wherein said base further includes a heating element positioned for heating said first high temperature cooking plate.

7. The apparatus of claim 4, wherein said lid further comprises a heating element positioned for heating said second high temperature cooking plate.

8. The apparatus of claim 1, wherein at least one of said first and second thermal fluid vessels further comprise a container heating element formed as an integral part of said flexible panel.

9. The apparatus of claim 1, wherein at least one of said first and second thermal fluid vessels further comprise a container heating element positioned inside said fluid chamber.

10. The apparatus of claim 1, wherein at least one of said first and second thermal fluid vessels further comprise a container heating element attached to a surface of said flexible panel.

11. The apparatus of claim 1, further comprising a controller electrically connected to said container heating elements in said first and second thermal fluid vessels.

12. The apparatus of claim 11, further comprising a temperature sensor electrically connected to said controller, said temperature sensor positioned to measure a temperature on said high temperature cooking plate.

13. The apparatus of claim 11, further comprising a second temperature sensor electrically connected to said controller, said second temperature sensor positioned on one of said thermal fluid vessels to measure a temperature inside said fluid chamber.

14. The apparatus of claim 1, further comprising a base heating element, wherein said controller is configured to detect a presence of a high temperature cooking plate and said thermal fluid vessel and control said base heating element in response to a detected result.

15. The apparatus of claim 1, further comprising:
   a first latch coupled to said base, said first latch positioned to retain said first thermal fluid vessel; and
   a second latch coupled to said lid, said second latch positioned to retain said second thermal fluid vessel.

16. The apparatus of claim 1, wherein a food chamber for receiving the food to be heated is formed between said first thermal fluid vessel and said second thermal fluid vessel when said lid is lowered onto said base.

17. The apparatus of claim 16, wherein a watertight seal is formed between said first thermal fluid vessel and said second thermal fluid vessel by a gasket surrounding a food contact surface on each thermal fluid vessel.

18. The apparatus of claim 17, wherein said gaskets on said first and second thermal fluid vessels are configured to allow air to escape from said food chamber when said lid is lowered onto said base.

19. The apparatus of claim 16, further comprising a vacuum pump in fluid communication with said food chamber, wherein said flexible panel on said first thermal fluid vessel is drawn toward said flexible panel on said second thermal fluid vessel by operation of said vacuum pump.

\* \* \* \* \*